US008494159B2

(12) United States Patent
Hampapur et al.

(10) Patent No.: US 8,494,159 B2
(45) Date of Patent: Jul. 23, 2013

(54) SYSTEM AND PRACTICE FOR SURVEILLANCE PRIVACY-PROTECTION CERTIFICATION AND REGISTRATION

(75) Inventors: Arun Hampapur, Norwalk, CT (US); Sharathchandra Pankanti, Rego Park, NY (US); Andrew William Senior, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1435 days.

(21) Appl. No.: 12/062,978

(22) Filed: Apr. 4, 2008

(65) Prior Publication Data

US 2010/0284567 A1 Nov. 11, 2010

Related U.S. Application Data

(63) Continuation of application No. 10/989,760, filed on Nov. 16, 2004.

(51) Int. Cl.
*H04N 7/167* (2006.01)

(52) U.S. Cl.
USPC ........... 380/210; 382/103; 348/143; 707/705; 707/706; 380/201

(58) Field of Classification Search
USPC ........... 382/103; 380/210; 348/143; 707/705, 707/706
See application file for complete search history.

(56) References Cited

U.S. PATENT DOCUMENTS 6,546,119 B2 * 4/2003 Ciolli et al. .................. 382/104
7,508,941 B1 * 3/2009 O'Toole et al. .............. 380/228
2003/0023451 A1 * 1/2003 Willner et al. .................... 705/1
2003/0231769 A1 12/2003 Bolle et al.
2005/0102534 A1 * 5/2005 Wong ........................... 713/201
2005/0228685 A1 * 10/2005 Schuster et al. .................. 705/1
2007/0296817 A1 * 12/2007 Ebrahimi et al. ............. 348/161

OTHER PUBLICATIONS

Marianne L. Gras. "The Legal Regulation of CCTV in Europe" © 2004 Surveillance & Society and the author(s) ISSN: 1477-7487 (pp. 216-229) http://www.surveillance-and- society.org/articles2%0282%029/ regulation.pdf.*
David H. Flaherty. "Protecting Privacy in Surveillance Societies" © 1989 University of North Carolina Press. (pp. 402 & 404).*
Peter Danielson. "Video Surveillance for the rest of us: Proliferation, Privacy, and Ethics Education" © 2002 IEEE (pp. 162-167).*
Michael Caloyannides. "Society Cannot Function Without Privacy" IEEE Security & Privacy, May/Jun. 2003. © 2003 IEEE Computer Society (pp. 84-86).*

(Continued)

*Primary Examiner* — Beemnet Dada
*Assistant Examiner* — Thomas Gyorfi
(74) *Attorney, Agent, or Firm* — Tutunjian & Bitetto, P.C.; William J. Stock

(57) ABSTRACT

There is provided an apparatus for the certification of privacy compliance. The apparatus includes a registry of at least one of enrolled video surveillance operators, approved surveillance hardware devices, approved surveillance software programs, approved surveillance system installers, and approved entities that manage surveillance systems. The apparatus further includes a registry searcher, in signal communication with the registry, for receiving queries to the registry, and for determining whether at least one of a particular surveillance operator, a particular surveillance hardware device, a particular surveillance software program, a particular surveillance system installer, and a particular entity that manages a particular surveillance system is on the registry based on a given query.

27 Claims, 3 Drawing Sheets

OTHER PUBLICATIONS

Wikipedia article for "database" published Sep. 28, 2003 (4 pages) http://en.wikipedia.org/w/index.php?title=Database&oldid=1545558.*

Peter Danielson. "Video Surveillance for the rest of us: Proliferation, Privacy, and Ethics Education" International Symposium on Science and Technology, 2002 (ISTAS '02). © 2002 IEEE (pp. 162-167).*

Gary Marx. "A Tack in the Shoe: Neutralizing and Resisting the New Surveillance" Journal of Social Issues, vol. 59, May 2003. (16 pages) http://web.mit.edu/gtmarx/www/tack.html.*

Shelley O'Hara. "Easy Microsoft® Office Access 2003" © 2003 Que Inc. Excerpts from chapters 3 and 6 (18 pages total).*

Curtis Frye. "Microsoft® Office Excel® 2003 Step by Step" © 2003 Microsoft Press. Excerpt from Chapter 1 (pp. 1-20).*

"TRUSTe Seal Programs: Privacy Seal Programs" © 1997-2001 TRUSTe (web page dated Jun. 21, 2003 by Internet Archive) (1 page) http://web.archive.org/web/20030602143540/http://www.truste.com/programs/index.html*

Marcia Gonzales. "3.03 HIPPA Privacy: Practical Approaches and Experiences for Auditing for Privacy Compliance" (document date of Sep. 14, 2004) (18 pages + screenshot with date) http://www.ehcca.com/presentations/HIPAA9/3_03_1.pdf.*

"Industry Advisory Council eGovernment Shared Interest Group Resource Paper on Privacy Practices that Work: Eight Federal and Non-Federal Examples" Published Mar. 2004 (56 pages). (URL in box W).* http://www.actgov.org/knowledgebank/ whitepapers/Documents/Shared%20Interest%20Groups/ Collaboration%20and%20Transformation%20SIG/Privacy%20Practices%20That%20Work%20-% 20Eight%20Federal%20and%20Non%20Federal% 20Examples%20-%20CT%20SIG%20-% 2003-17-04.pdf.*

"The Authoritative Dictionary of IEEE Standards Terms, Seventh Edition" © 2000 Institute of Electrical and Electronics Engineers Inc. (p. 872).*

Ron Person. "Special Edition Using Microsoft 97" Published Dec. 17, 1996 by Que Publishing. (pp. 80-83)*

Andrew Senior et al.; Blinkering Surveillance: Enabling Video Privacy through Computer Vision; IBM Research Div. Yorktown Heights, NY, Computer Science, Aug. 28, 2003; pp. 1-14.

Wikipedia Foundation, Inc. Wikipedia entry for "Closed-Circuit Television." Last modified Oct. 2008. (19 pages) http://www.en.wikipedia.org/wiki/Closed-circuit_television.

Duda, D., et al. "Security Systems Made Secure With Proper Commissioning." Sep. 2004, (4 pages) http://www.csemag.com/index.asp?layout=articlePrint&articleID=CA453661.

* cited by examiner

SYSTEM AND PRACTICE FOR SURVEILLANCE PRIVACY-PROTECTION CERTIFICATION AND REGISTRATION

CROSS-REFERENCE TO RELATED APPLICATIONS

This application is a continuation of U.S. application Ser. No. 10/989,760, filed on Nov. 16, 2004, which is incorporated by reference herein in its entirety.

FIELD OF THE INVENTION

The present invention generally relates to video surveillance and, more particularly, to privacy protection in video surveillance systems.

BACKGROUND OF THE INVENTION

As sensor technologies improve and data processing and transmission capabilities improve and become more widespread, the potential for intrusions on private citizens' privacy is also increased. One area of particular sensitivity for privacy intrusion is the rapid increase in video surveillance. It has been shown that there are technological means available for preventing certain kinds of privacy intrusion with video surveillance equipment, and reducing the effectiveness or effects of other privacy intrusion. Some ways to prevent and/or reduce the effects of certain types of privacy intrusion are described in U.S. Patent Application Serial No. 2003/0231769, entitled "Application Independent System, Method, and Architecture for Privacy protection, Enhancement, Control, and Accountability in Imaging Service Systems", filed on Jun. 18, 2002, commonly assigned to the assignee herein, and incorporated by reference herein in its entirety. These methods include the re-rendering or summarization of surveillance video so that only certain details are presented (those required for the task, such as the number and location of people in the camera field of view) while hiding other details (e.g., the appearance and, hence, race, age, gender of those people). The deployment of such privacy protection schemes may be encouraged by public opinion or even legislated in certain jurisdictions and for certain purposes.

Accordingly, it would be desirable and highly advantageous to have further methods and apparatus for providing privacy protection in video surveillance systems that enable the public to ascertain that such privacy protection is in place.

SUMMARY OF THE INVENTION

These and other drawbacks and disadvantages of the prior art are addressed by the present invention, which is directed to privacy protection in video surveillance systems.

According to an aspect of the present invention, there is provided an apparatus for the certification of privacy compliance. The apparatus includes a registry of at least one of enrolled video surveillance operators, approved surveillance hardware devices, approved surveillance software programs, approved surveillance system installers, and approved entities that manage surveillance systems. The apparatus further includes a registry searcher, in signal communication with the registry, for receiving queries to the registry, and for determining whether at least one of a particular surveillance operator, a particular surveillance hardware device, a particular surveillance software program, a particular surveillance system installer, and a particular entity that manages a particular surveillance system is on the registry based on a given query.

According to another aspect of the present invention, there is provided a privacy protection verification system. The system includes a compliance device for receiving at least one test stream from a privacy protection system, evaluating the at least one test stream with respect to at least one category of privacy intrusive data corresponding to a privacy protection goal, and outputting a measure of compliance of the at least one test stream with respect to the privacy protection goal.

According to yet another aspect of the present invention, there is provided a method for the certification of privacy compliance. The method includes the step of maintaining a registry of at least one of enrolled video surveillance operators, approved surveillance hardware devices, approved software programs, approved surveillance system installers, and approved entities that manage surveillance systems. The method further includes the step of providing access to the registry via queries directed to the registry to determine if at least one of a particular surveillance operator, a particular surveillance hardware device, a particular surveillance software program, a particular surveillance system installer, and a particular entity that manages a particular surveillance system is on the registry.

According to an additional aspect of the present invention, there is provided a method for privacy protection verification. The method includes the steps of receiving at least one test stream from a privacy protection system, evaluating the at least one test stream with respect to at least one category of privacy intrusive data corresponding to a privacy protection goal, and outputting a measure of compliance of the at least one test stream with respect to the privacy protection goal.

According to a further aspect of the present invention, there is provided a method for privacy protection verification. The method includes the steps of reviewing a surveillance product that is associated with a pre-specified level of claimed privacy protection, and certifying whether the surveillance product meets the pre-specified level of claimed privacy protection.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION OF PREFERRED EMBODIMENTS

Figure 1:
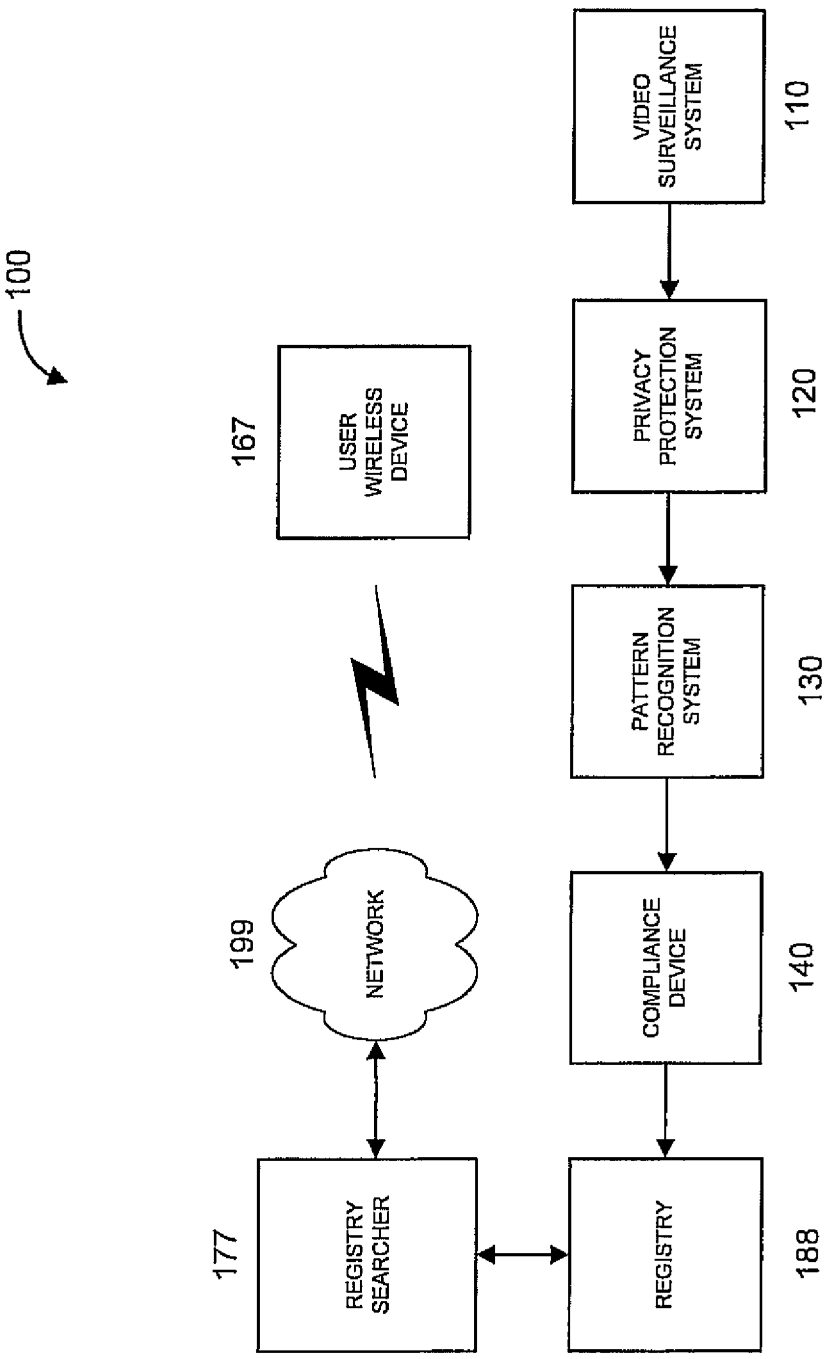
FIG. 1 is a block diagram illustrating an environment in which the present invention may be applied, according to an illustrative embodiment of the present invention.

The present invention is directed to privacy protection in video surveillance systems.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (“DSP”) hardware, read-only memory (“ROM”) for storing software, random access memory (“RAM”), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

FIG. 1 is a block diagram illustrating an environment 100 in which the present invention may be applied, according to an illustrative embodiment of the present invention. The environment 100 includes a video surveillance system 110, a privacy protecting system 120, a pattern recognition system 130, and a compliance device 140. In the illustrative embodiment of FIG. 1, the video surveillance system 110 is intended to be a conventional video surveillance system and the privacy protecting system 120 is intended to implement privacy protecting measures with respect to any video input thereto from the video surveillance system. It is to be appreciated that in other embodiments of the present invention, the privacy protecting system 120 may be included as part of the video surveillance system 110 (e.g., in the case that the video surveillance system 110 is claimed to have privacy protecting features that are to be verified for compliance). Moreover, it is to be further appreciated that the present invention is not limited to privacy preservation with respect to only video and, thus, other types of information and/or media including, e.g., audio, may also be utilized by the present invention, while maintaining the spirit of the present invention. The pattern recognition system 130 recognizes patterns in an input stream (video and/or audio, etc.), and an output of the pattern recognition system 130 may be used by the compliance device 140 to determine compliance with a pre-specified privacy preserving policy, law, and/or so forth, and may further optionally specify a degree of compliance. While the pattern recognition system 130 and the compliance device 140 are shown as separate elements in FIG. 1, in other embodiments of the present invention, these two elements may be implemented as one single element.

Information relating to compliance of the privacy protecting system 120 may be stored in one or more registries 188 (hereinafter ‘registry”). The registry 188 is searched using a registry searcher 177. The registry searcher 177 conducts searches of the registry 188 based on, e.g., user submitted queries as described in further detail herein below. One or more networks 199 (hereinafter “network”) provide access to the registry 188 via the registry searcher 177. That is, user submitted queries are provided to the registry searcher 177 via the network 199. It is to be appreciated that the registry 188 and the registry searcher 177 may be part of the compliance device 140, may be part of another device, or may be a standalone device.

The registry searcher 177 may be used to search the registry 188 by an individual that desires to know whether or not the privacy protecting system 120 (or any other system or device to be tested) complies with any policy preserving standards, etc. The registry 188 may store, e.g., information relating whether a particular device/system is in compliance and, optionally, to what degree of compliance. Thus, for example, a user with a wired or wireless device 167 may be capable of accessing a registry 188 via the network 199 to determine compliance. The user may check from home via the Internet or any other way as readily contemplated by one of ordinary skill in the art while maintaining the spirit of the present invention. The registry searcher 177 receives user queries and determines, e.g., whether a given device, device operator, and/or so forth is listed on the registry 188 based on a given query. As an example, the registries 188 may be implemented in memories on a computer, with the registry searcher 177 being a software program on the same or a different computer for parsing a query and using information extracted there from to match with information in the registry 188. Of course, given the teachings of the present invention provided herein, other configurations and implementations may also be employed while maintaining the spirit of the present invention.

It is to be appreciated that, in the illustrative embodiment of FIG. 1, the video surveillance system 110 and the privacy protecting system 120 are operated by a first entity such as the owner of the site at which the video surveillance system 110 is installed. Further, the pattern recognition system 130, and the compliance device 140 are operated by a second entity that is tasked with compliance verification. Moreover, the registry and the registry searcher may also be operated by the second entity. Optionally, another entity may be tasked with maintaining the certification/verification results obtained by the second entity.

It is to be further appreciated that the means of communication between the privacy protecting system 120 and the rest of the world may be isolated to prevent tampering with the privacy protecting system 120 and so forth. Moreover, other elements of environment 100 may be similarly or otherwise protected from tampering, hacking, unauthorized access, and so forth.

It is to be yet further appreciated that any of the elements above including, but not limited to, the privacy protecting system 120, the pattern recognition system 130, and the compliance device 140 may be implemented as general purpose or special purpose computers have one or more processors, one or more memories, one or more user interfaces, and so forth. Given the teachings of the present invention provided herein, one of ordinary skill in the related art will contemplate these and various other elements for implementing the present invention while maintaining the spirit of the present invention.

At the heart of any privacy preserving scheme must be a policy that guides what is and/or is not permissible within the scheme. Such guidelines may be issued by a government agency, in the form of laws (e.g., UK Data Protection Act) or guidelines (e.g., Swiss Federal Privacy Commissioner), or may be unilaterally issued by a non-governmental body or service operator (c.f., Australian Biometrics Institute Privacy Code). It is expected that many entities will have codes with similar principles. It is to be appreciated that the present invention may be employed with any type of privacy preserving standards including, but not limited to, laws, policies adopted by entities including governments and subdivisions thereof, corporations, businesses, organizations, and so forth. It is to be appreciated that the preceding types of privacy preserving standards are merely illustrative and, thus, other types of privacy preserving standards may also be employed in accordance with the present invention while maintaining the spirit of the present invention.

There are a number of levels on which video surveillance systems can be certified as complying with privacy guidelines. Hardware and software manufacturers may wish to have prototype designs registered with the certification body. For instance, a PrivacyCam has been proposed, which is a self-contained unit that implements certain video privacy protection algorithms. The PrivacyCam is further described by Senior et al., in "Blinkering Surveillance: Enabling Video Privacy through Computer Vision", IBM Research Report, RC22886 (WO308-109), Computer Science, Aug. 28, 2003, the disclosure of which is incorporated by reference herein in its entirety. The certification body may inspect the hardware design and/or software source code or conduct testing of the privacy protection device (in the manner of, e.g., Underwriters Laboratories) to ascertain the degree of privacy protection that the device or software affords and to detect its robustness against standard circumvention techniques.

After such assessment the device could be registered and listed in a registry. Moreover, the listing of a particular assessed device in the registry may also optionally specify a degree of compliance with the organization's privacy policy. For example, meeting a threshold level of privacy protection may entitle a particular device to simply a listing and, if the threshold level is exceeded, then the degree of compliance (above the threshold) may be specified. Further, conditions on a specified level of compliance may be used when the threshold is not met. Of course, given the teachings of the present invention provided herein, other arrangements may also be employed with respect to specifying a degree of compliance, while maintaining the spirit of the present invention.

Enrollment (also referred to herein as "registration") in a privacy certification scheme may be voluntary or compulsory.

Figure 2:
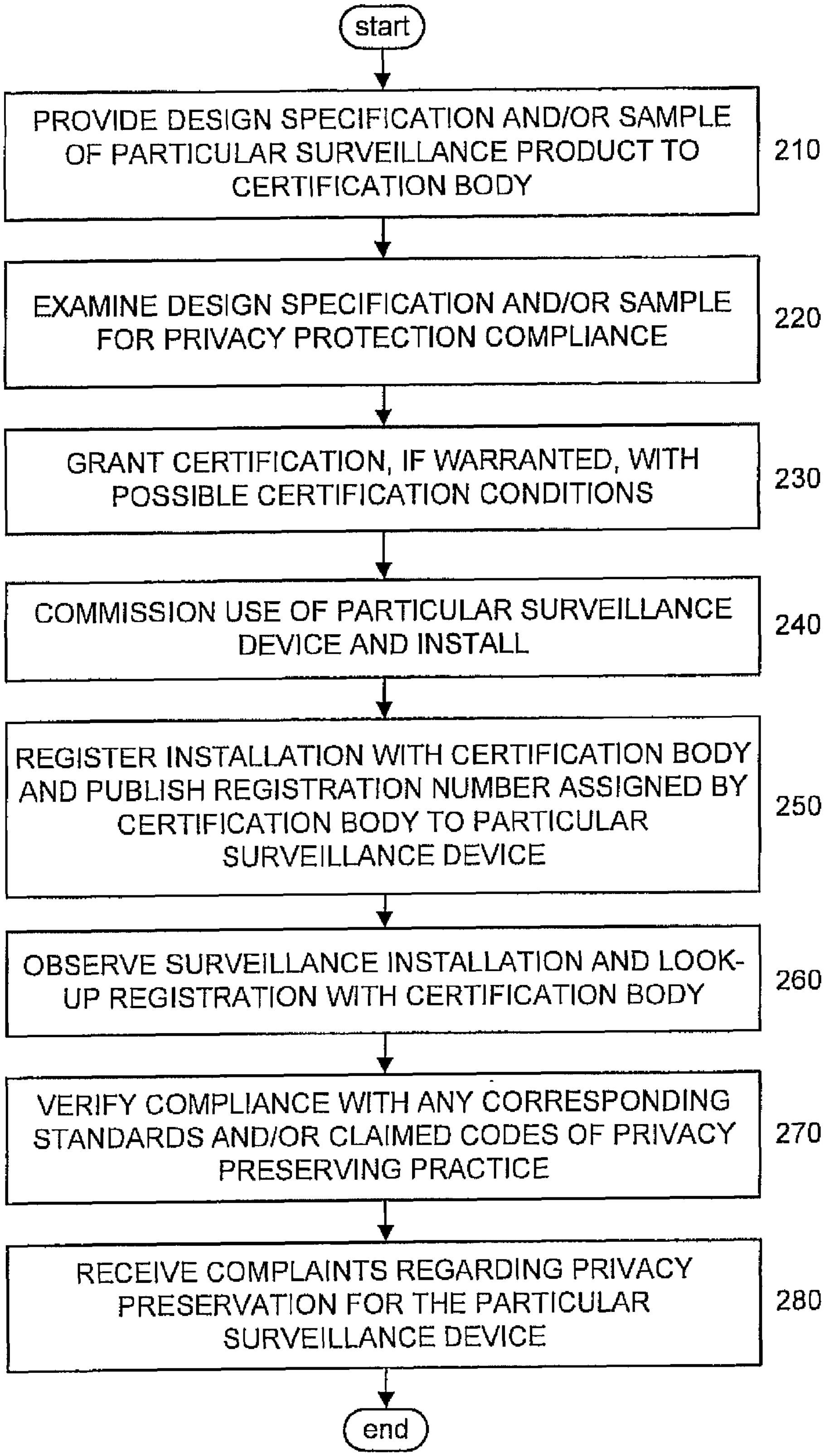
FIG. 2 is a flow diagram illustrating a method for privacy registration according to an illustrative embodiment of the present invention.

FIG. 2 is a flow diagram illustrating a method for privacy registration according to an illustrative embodiment of the present invention. It is to be appreciated that the method of FIG. 2 is merely illustrative and, thus, given the teachings of the present invention provided herein, other approaches may also be employed with respect to privacy registration that maintain the spirit of the present invention.

The design specification and/or a sample of a particular surveillance device are provided to a certification body (step 210). It is to be appreciated that while the method of FIG. 2 is described with respect to a "particular surveillance device", a complete system or any element or combination of elements thereof may also be registered (evaluated for compliance, and so forth) in accordance with the principles of the present invention while maintaining the scope of the present invention. The certification body examines the design specification and/or sample of the particular surveillance device for privacy protection compliance (step 220). The certification body grants certification, if warranted, to the particular surveillance device, with possible conditions on the certification depending upon the mode of operation (step 230). For example, a device may only comply with, e.g., a particular privacy preserving standard, when the device is operated in a certain way or in a certain mode of operation and, if operated in a different way or in a different mode of operation may not comply with the standard or may achieve a lesser level of certification. A customer commissions the use of the particular surveillance device, e.g., either specifically or as included in a system, and the particular surveillance device is then installed for use (step 240). The customer registers the installation with the certification body and publicly publishes a registration number assigned by the certification body to the particular surveillance device as installed (step 250). A citizen observes the surveillance installation and looks-up the registration number with the certification body (step 260). The certification body verifies compliance with any corresponding standards, laws, and/or claimed codes of privacy preserving practice (step 270). The citizen, the installing entity, or some other entity may submit complaints to the certification body (280), e.g., via the network 199. The complaints may then be listed on one of the registries 188 for future use by the certification body, the entity commissioning the particular surveillance device, other citizens, and/or so forth. The word "complaints" is intended to include, but not be limited to, the following: voluntarily registering non-complying devices, reporting installed non-complying devices (e.g., that were previously certified as in compliance), and so forth.

Regarding entities that operate video surveillance systems, such entities may wish to claim and advertise compliance with a particular organization's privacy policy or some other privacy preserving policy. For example, an approach similar to TRUSTe may be utilized, wherein entities subscribe to the organization's code of practice and privacy policy, and the organization polices compliance in a variety of manners.

Such policing could be implemented by first identifying that the hardware and/or software in use is indeed capable of preserving privacy. Inspections could also be carried out to verify that a particular device/system/subsystem/etc. (hereinafter device) was installed in a compliant manner and that the device is being run in a compliant manner (that privacy features were turned on, the staff trained appropriately, the staff actually complying with codes of practice, and so forth).

Inspections could be voluntary, to enable an entity to claim a fully certified level of compliance, or could be at the instigation of the organization, particularly when compliance has been challenged by a third party. Moreover, inspections could be implemented at pre-specified and/or random times.

To achieve credibility with the public and those observed by the surveillance system, mechanisms need to be available for people to verify and challenge the compliance of entities with the code.

A public registry could be made open that lists those entities that have enrolled in the scheme. A more detailed registry could list specific installations (branches or sites of the entity) that were claimed/deemed to be compliant. An even more detailed registry could list the actual specific devices.

A member of the public could verify compliance by searching the registry (e.g., on a web site) using a number of mechanisms. For example, searching may be conducted based on an entity's name, location (GPS coordinates, address, and so forth), unique IDs (unique IDs would be issued on registration), and so forth. It is to be appreciated that the preceding mechanisms for searching the registry are merely illustrative and, given the teachings of the present invention provided herein, other mechanisms for searching the registry may also be employed while maintaining the spirit of the present invention.

In the case of unique IDs, the unique IDs could be printed on notices, such as those required by law in many countries for CCTV installations. The ID could identify the installation and/or the specific device. Moreover, the ID could identify the entity that had the specific device installed and/or the entity tasked with verifying compliance. Individuals searching the registry would be able to see the level of compliance and whether that compliance had been verified. Moreover, other parameters may also be able to be ascertained from the registry including, but not limited to, how recently the compliance was verified, whether the organization had any outstanding complaints, and so forth. It is to be appreciated that the preceding other parameters are merely illustrative and, thus, other parameters may also be employed while maintaining the spirit of the present invention.

The unique IDs would also form a mechanism for individuals to request personal data. For instance, it is required by UK Data protection law that an individual may request any video of the individual captured by a CCTV system, by specifying the time and location.

In many cases, verification of a surveillance system necessarily will have to be carried out by expert human operators. However, it is to be appreciated that the present invention is not limited to human verification of compliance with privacy preserving policies and, thus, automatic verification or a combination of human and automatic verification may also be employed in accordance with the present invention while maintaining the spirit of the present invention.

Hardware inspection might use formal computing methods to prove that a program or piece of hardware is incapable of preserving privacy-intrusive information (e.g., due to design limitations, due to mis-configuration, and so forth). Of course, in some circumstances, it may be preferable to have a human verifying a manufacturer's claim of effectiveness, a task that may require expert knowledge.

One of many areas that may be automated is in determining if a video-re-rendering system is sufficiently strong. The present invention provides a method and system for determining if privacy protection is effective based on a pattern recognition system and test video sequences (see FIG. 3 herein below). The pattern recognition system is one that can detect the type of information that is considered "privacy intrusive" for the application. For example, the pattern recognition system may include and/or identify any of the following: a person detector, a face/gender/race/gait recognition system, a moving object detector, a vehicle license plate reader, and so forth. It is to be appreciated that the present invention is not limited to detecting the preceding types of patterns and, thus, other types of patterns relating to privacy (including privacy intrusion) may also be employed while maintaining the spirit of the present invention. A set of surveillance video files including sensitive information (e.g., information that is to be protected (e.g., identity, etc.) is collected and provided to the pattern recognition system. In this case, the set of surveillance video files were obtained from a video surveillance system that has been claimed to meet a pre-specified privacy preserving policy. Accordingly, the set of surveillance video files has been already subject to privacy preserving measures prior to being fed to the pattern recognition system. The pattern recognition system attempts to identify patterns of interest relating to the sensitive information in the set of surveillance video files. This same video is then fed into a compliance device that determines compliance and optionally associates a degree of compliance with a particular device under test) and the number of successful detections/identifications by the pattern recognition system is a measure of the failure of the system to protect privacy. For example, the more people that are identified means that their privacy was not preserved if the equipment was intended to only specify a number of people in a given area irrespective of their identity. Naturally, failure of the pattern recognition system is not proof of the system's success, which preferably but not necessarily should be judged by a human. For example, a system that produces no output may well pass the test, but would be useless. Simple tricks might defeat a known pattern recognition system (e.g. turning down the brightness, introducing jitter, blurring slightly) while still preserving privacy-intrusive information. Thus, human or machine overseeing of the process is preferred.

Figure 3:
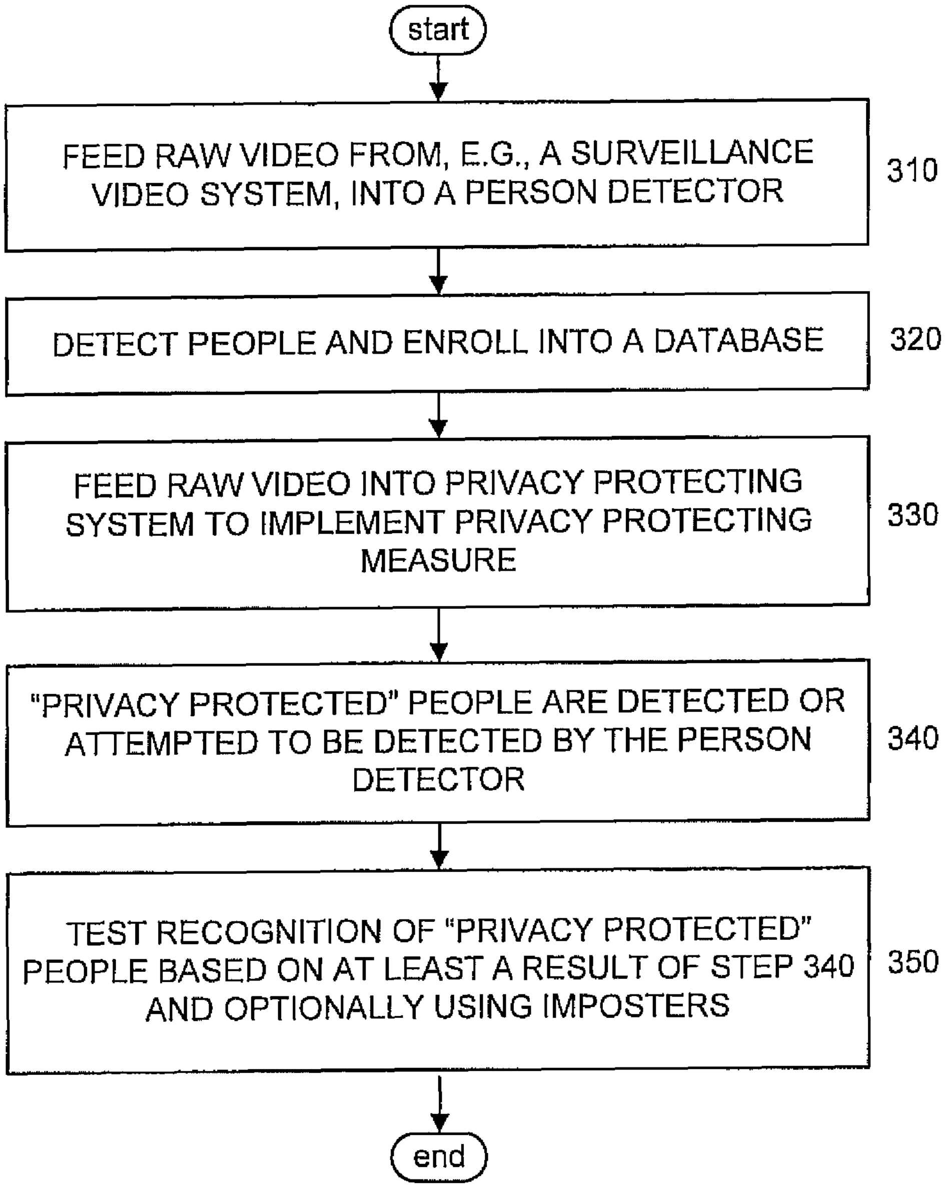
FIG. 3 is a flow diagram illustrating a method for automatically testing compliance of a video system with a pre-determined privacy preserving standard, according to an illustrative embodiment of the present invention.

FIG. 3 is a flow diagram illustrating a method for automatically testing compliance of a video system with a pre-determined privacy preserving standard, according to an illustrative embodiment of the present invention. In the case of FIG. 3, a privacy protecting system is used to modify or otherwise implement privacy preserving measures on a raw video from a conventional surveillance video system (i.e., a surveillance video system that does not have privacy preserving capabilities).

Raw video from, e.g., a surveillance video system, is fed into a pattern recognition system (e.g., a person detector) (step 310). People are detected by the person detector and are enrolled into a database (step 320). The raw video is then fed into a privacy protecting system to implement privacy protecting measures (step 330). That is, the privacy protecting system has been claimed to meet a pre-specified privacy preserving policy with any input video provided thereto. "Privacy protected" people (as protected by the privacy protecting system) are detected or attempted to be detected by the person detector (step 340). The recognition of the "privacy protected" people, which were enrolled into the database at step 320, is tested based on at least a result of step 340 (step 350). The testing performed at step 350 may be implemented, e.g., with the addition of imposters.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus for the certification of privacy compliance, comprising:
- a registry of approved video surveillance systems having a quantity associated with each entry in the registry to indicate a degree of compliance with a privacy policy; and
- a registry searcher, in signal communication with the registry, for receiving queries to the registry, and for determining by a computer processor whether a particular video surveillance system is on the registry based on a given query.

2. The apparatus of claim 1, wherein the registry of enrolled video surveillance operators also includes a list of at least one of hardware, software, installers, and management entities used by the operator.

3. The apparatus of claim 1, wherein the registry searcher searches the registry for a given item of interest based on publicly displayed identification codes included in the queries.

4. The apparatus of claim 1, wherein the enrolled video surveillance operators are pre-committed to comply with at least one code of privacy preserving practice.

5. The apparatus of claim 1, wherein the registry further includes information regarding compliance with the at least one code of privacy preserving practice as verified by a designated compliance verifying entity.

6. The apparatus of claim 1, wherein approval is based in part upon a determination of privacy protection provided by particular hardware.

7. The apparatus of claim 1, wherein the quantity associated with each of the entries has one of at least three possible values.

8. The apparatus of claim 1, wherein the registry further includes enrolled video surveillance operators.

9. The apparatus of claim 1, wherein the registry further includes approved video surveillance hardware devices.

10. The apparatus of claim 1, wherein the registry further includes approved video surveillance software programs.

11. The apparatus of claim 1, wherein the registry further includes approved video surveillance installers.

12. The apparatus of claim 1, wherein the registry further includes approved entities that manage video surveillance systems.

13. A method for the certification of privacy compliance, comprising the steps of:
- maintaining a registry of approved video surveillance systems having a quantity associated with each entry in the registry to indicate a degree of compliance with a privacy policy; and
- providing access to the registry by a computer processor via queries directed to the registry to determine if a particular video surveillance system is on the registry.

14. The method of claim 13, wherein the registry of enrolled video surveillance operators also includes a list of at least one of hardware, software, installers, and management entities used by the operator.

15. The method of claim 13, wherein said step of providing access to the registry utilizes publicly displayed identification codes to search the registry for a given code of interest.

16. The method of claim 13, wherein the enrolled video surveillance operators are pre-committed to comply with at least one code of privacy preserving practice.

17. The method of claim 13, wherein the registry further includes information regarding compliance with the at least one code of privacy preserving practice as verified by a designated compliance verifying entity.

18. A program storage device readable by machine, tangibly embodying a program of instructions executable by the machine to perform method steps for the certification of privacy compliance as recited in claim 13.

19. A method for privacy protection verification, comprising the steps of:
- automatically reviewing a video surveillance product that is associated with a pre-specified level of claimed privacy protection according to a privacy policy to determine a degree of actual privacy protection, said automatic review being performed by a computer processor; and
- certifying whether the video surveillance product meets the pre-specified level of claimed privacy protection in the privacy policy.

20. The method of claim 19, wherein the determined a degree of actual privacy protection has one of at least three possible values.

21. The method of claim 19, wherein certifying is based in part upon a determination of privacy protection provided by particular hardware.

22. The method of claim 19, wherein said reviewing and certifying steps are performed by a single entity.

23. The method of claim 19, wherein the surveillance product includes at least one of a design of the surveillance product, hardware corresponding to the surveillance product, software corresponding to the surveillance product, and any combination thereof.

24. The method of claim 19, wherein said certifying step provides a public certification of the surveillance product.

25. The method of claim 19, wherein said reviewing step is at least one of automated and manually performed.

26. The method of claim 19, wherein said reviewing step comprises the step of statistical spot checking the surveillance product by a human.

27. A program storage device readable by machine, tangibly embodying a program of instructions executable by the machine to perform method steps for privacy protection verification as recited in claim 19.

* * * * *